(12) United States Patent
Garza et al.

(10) Patent No.: US 8,595,190 B2
(45) Date of Patent: Nov. 26, 2013

(54) METHODS AND APPARATUS RELATED TO COMPLETION OF LARGE OBJECTS WITHIN A DB2 DATABASE ENVIRONMENT

(75) Inventors: Oscar J. Garza, Cedar Park, TX (US); Michael J. Hanus, Cedar Park, TX (US); Kenneth M. McDonald, Cedar Park, TX (US); Kenneth J. Durfee, Round Rock, TX (US)

(73) Assignee: BMC Software, Inc., Houston, TX (US)

( * ) Notice: Subject to any disclaimer, the term of this patent is extended or adjusted under 35 U.S.C. 154(b) by 118 days.

(21) Appl. No.: 13/198,369

(22) Filed: Aug. 4, 2011

(65) Prior Publication Data

US 2013/0006940 A1    Jan. 3, 2013

Related U.S. Application Data

(60) Provisional application No. 61/503,470, filed on Jun. 30, 2011.

(51) Int. Cl.
*G06F 7/04* (2006.01)
*G06F 17/30* (2006.01)

(52) U.S. Cl.
CPC ...... *G06F 17/3028* (2013.01); *G06F 17/30595* (2013.01); *G06F 17/30* (2013.01)
USPC ............ 707/648; 707/649; 707/640; 707/609

(58) Field of Classification Search
CPC combination set(s) only.
See application file for complete search history.

(56) References Cited

U.S. PATENT DOCUMENTS

| | | | |
|---|---|---|---|
| 6,615,219 B1 * | 9/2003 | Bruso et al. | 707/699 |
| 6,651,073 B1 | 11/2003 | Lyle et al. | |
| 7,730,044 B2 | 6/2010 | Hanus et al. | |
| 2002/0038313 A1 * | 3/2002 | Klein et al. | 707/200 |
| 2008/0281865 A1 | 11/2008 | Price et al. | |

* cited by examiner

*Primary Examiner* — Bruce Moser
(74) *Attorney, Agent, or Firm* — Brake Hughes Bellermann LLP

(57) ABSTRACT

In one general aspect, an apparatus can include a completion identifier configured to identify, for completion processing, a large object (LOB) deleted from an auxiliary table within a DB2 database environment based on a space map record associated with the large object where the auxiliary table functions as an auxiliary space to a base table. The apparatus can also include a completion analyzer configured to identify a resource where an image of the large object is stored at a time before the deletion of the large object from the auxiliary table.

22 Claims, 7 Drawing Sheets

METHODS AND APPARATUS RELATED TO COMPLETION OF LARGE OBJECTS WITHIN A DB2 DATABASE ENVIRONMENT

RELATED APPLICATION

This application claims priority to and the benefit of U.S. Provisional Patent Application Ser. No. 61/503,470, filed on Jun. 30, 2011, entitled, "Methods and Apparatus Related to Completion of Large Objects within a DB2 Database Environment," which is incorporated herein by reference in its entirety.

TECHNICAL FIELD

The subject matter of the present disclosure relates to handling of large objects (LOBs) in a database management system.

BACKGROUND

A database management system (DBMS) can be configured to manage large databases and provide an operational environment in which stored information can be retrieved or updated. In one type of DBMS, which can be referred to as a relational database system, information can be stored in tables where each table can have one or more columns and one or more rows. Each column in a table can be referred to as an attribute of the table, and each row in a table can be referred to as a record. One known example of a relational database management system is a DB2 database system.

When transactions are processed in a DB2 database system (i.e., when there is an insert, update or delete operation made to a record), a subsystem of the DB2 database system can be configured to create log records and write them to log files (also can be referred to as a DB2 Log). Once written, the log records can be used for various purposes, such as data recovery, migration, and reporting. The log records can include control information (e.g., log record sequence number, transaction identifier connecting the log record to other log records for the same transaction, etc.) and different types of content that depend on the objective of the log. For example, a log record can include data from the first changed byte to the last changed byte or the end of the row of an update.

In some DB2 database systems (e.g., DB2 version 10) logging can be selectively performed on certain objects within the DB2 database systems. For example, logging of complete after images of large object (LOBs) in an auxiliary table within some known DB2 database systems may be performed after certain types of operations such as inserts and updates have been executed, but logging of complete prior images before execution of deletes and updates of the LOBs will not be performed. Such LOBs, where only current images or after images of the LOBs are logged (for inserts and updates, but not for deletes), can be referred to as partially logged LOBs, or as selectively logged LOBs, because prior images of the LOBs are not logged. Accordingly, certain operations such as undo operations may not be readily performed for partially logged LOBs. Operations for partially logged LOBs may be limited to, for example, migration and reporting type output only within a DB2 database system.

The internal structure of the DB2 environment, and in particular, the internal structure of auxiliary tables that store LOB data can render known completion methods (e.g., typical row completion methods) inefficient or inoperable. Differences between auxiliary tables storing LOBs and regular tables that may render known completion methods inefficient or inoperable include multiple pages and/or log records representing a single LOB versus a single DB2 row for a regular table, the lack of details for prior images of LOBs, partial image copies including only part of the data representing a full LOB. Also, the difficulties associated with processing partially logged LOBs may be exacerbated by the fact that, for example, SHRLEVEL CHANGE image copies may not include all of the pages that represent a multipage LOB, and/or by the movement of text strings that may be used to generate data description language (DDL) from, for example, typical VARCHAR columns in base tables to auxiliary tables for, for example, TRIGGERs, VIEWs, FUNCTIONS, MQTs, and so forth, in some known DB2 database systems. Thus, a need exists for systems, methods, and apparatus to address the shortfalls of present technology and to provide other new and innovative features.

SUMMARY

In one general aspect, an apparatus can include a completion identifier configured to identify, for completion processing, a large object (LOB) deleted from an auxiliary table within a DB2 database environment based on a space map record associated with the large object where the auxiliary table functions as an auxiliary space to a base table. The apparatus can also include a completion analyzer configured to identify a resource where an image of the large object is stored at a time before the deletion of the large object from the auxiliary table.

In another general aspect, a computer-readable storage medium can be configured to store instructions that when executed cause a processor to perform a process. The instructions comprising instructions to determine that a large object (LOB) stored, at a first time, in an auxiliary table to a base table within a DB2 database environment has changed, at a second time, based on a space map record referencing the large object stored in the auxiliary table. The instructions can be configured to designate the large object for completion processing in response to the determination, and configured to identify, in response to the designation of the large object for completion processing, a storage location of an image of the large object within a resource of the DB2 database environment based on the space map record and based on a DB2 catalog.

In yet another general aspect, a computer-readable storage medium can be configured to store instructions that when executed cause a processor to perform a process. The instructions comprising instructions to designate, for completion processing, a plurality of large objects (LOB) associated with an auxiliary table to a base table within a DB2 database environment, and identify, in response to the designation of the plurality of large objects for completion processing, a first plurality of resources for completion processing of a first portion of the plurality of large objects. The instructions can include instructions to identify, in response to the designation of the plurality of large objects for completion processing, a second plurality of resources for completion processing of a second portion of the plurality of large objects, and identify a resource common to the first plurality of resources and the second plurality of resources.

The details of one or more implementations are set forth in the accompanying drawings and the description below. Other features will be apparent from the description and drawings, and from the claims.

DETAILED DESCRIPTION

Figure 1:
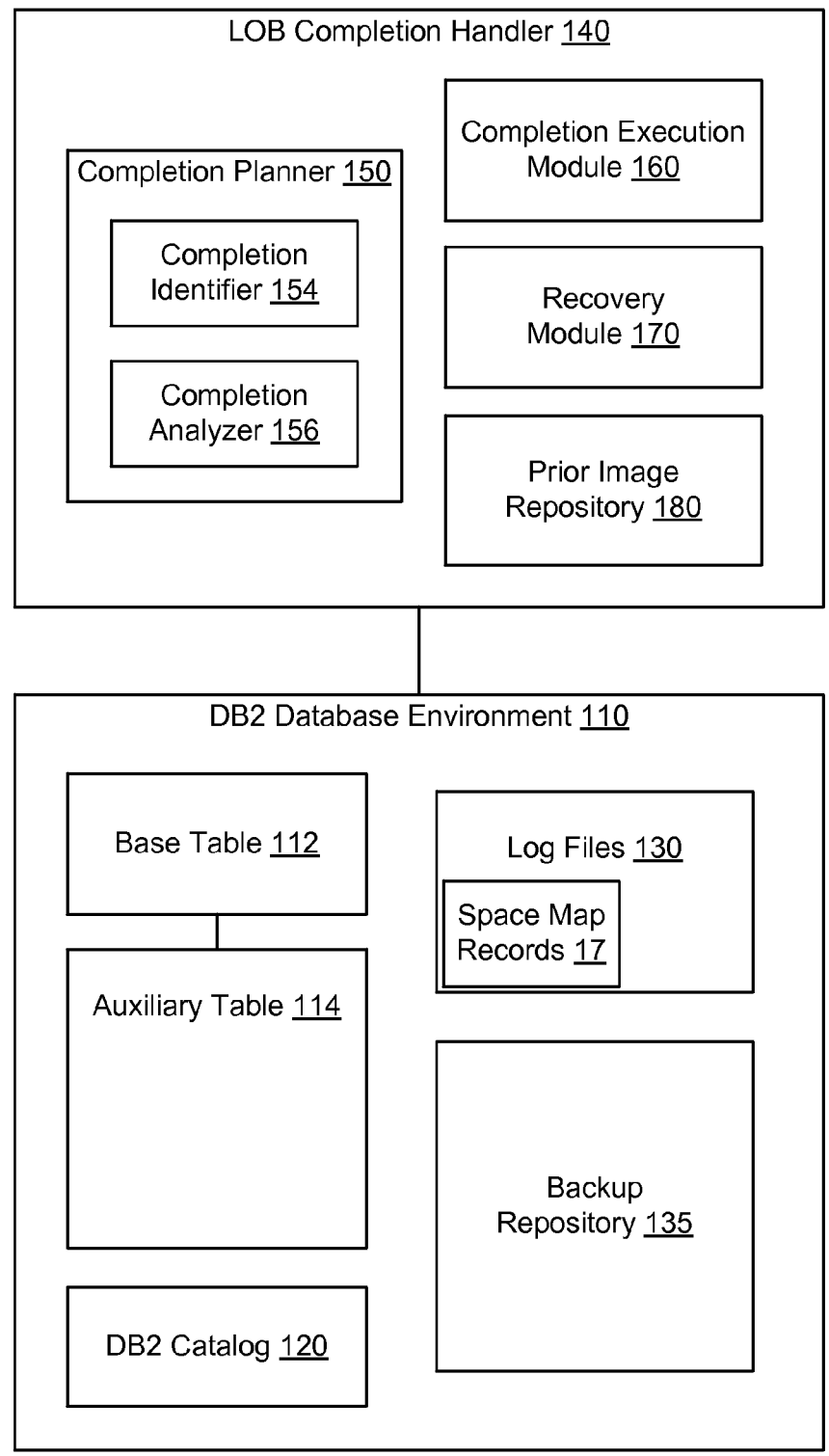
FIG. 1 is a diagram that illustrates a LOB completion handler associated with a DB2 database environment, according to an embodiment.

FIG. 1 is a diagram that illustrates a LOB completion handler 140 associated with a DB2 database environment 110, according to an embodiment. The LOB completion handler 140 is configured to perform completion processing (also can be referred to as completion) on large objects (LOBs) stored in an auxiliary table 114 to a base table 112 within the DB2 database environment 110. Specifically, the LOB completion handler 140 is configured to produce (e.g., retrieve, generate, reconstruct, discover) prior images of LOBs after changes (e.g., modifications, updates, deletions) have been made to the LOBs, and store the prior images of the LOBs in a prior image repository 180 where they can be accessed at a later time. As shown in FIG. 1, the prior image repository 180 resides outside of the DB2 database environment 110. An image can be, for example, a complete copy (or snapshot) of an object stored in a database. In some embodiments, the DB2 database environment 110 can be referred to as, or can be a part of, a database management system (DBMS).

For example, the LOB completion handler 140 can be configured to produce (e.g., retrieve, generate) a prior image of a LOB after the LOB has been deleted (which can be a type of modification) from the auxiliary table 114. The LOB can be deleted from the auxiliary table 114 at a specified time, and the prior image of the LOB can be an image of the LOB (as it existed within the auxiliary table 114) before (e.g., immediately before) the specified time. As another example, the LOB completion handler 140 can be configured to retrieve a prior image of a LOB after the LOB has been modified (e.g., changed) within the auxiliary table 114. In such embodiments, the LOB after the modification (and currently stored in the auxiliary table 114) can be referred to as a current image, or as an after image of the LOB. The prior image of the LOB can be an image of the LOB before the modification to the LOB within the auxiliary table 114. Completion processing can be the process of retrieving prior images (and storage of the prior images) after a modification has been made to, for example, a LOB within the auxiliary table 114.

The LOB completion handler 140 can be configured to produce prior images of LOBs when logging of the auxiliary table 114 is selectively performed. For example, logging of complete images (e.g., after images) of the auxiliary table 114 may be performed after certain types of operations such as inserts and updates have been executed, but logging of complete prior images before execution of deletes and updates may not be performed. Log records related to processing (e.g., transactions such as inserts, updates, or deletes) executed with respect to objects stored in the base table 112 and/or to LOBs stored in the auxiliary table 114 can be stored in log files 130 of the DB2 database environment 110. In some embodiments, the base table 112 may not be selectively logged while the auxiliary table 114 is selectively logged. In some embodiments, the log files 130 can define a continuum of log data that is defined within the DB2 database environment 110 as actions are performed within the DB2 database environment 110.

As a specific example, an image, which can be referred to as a current image or as an after image, of a LOB stored in the auxiliary table 114 may be stored in a log record after an update to the LOB has been executed. However, an image, which can be referred to as a prior image or as a before image, of the LOB stored in the auxiliary table 114 before the update is executed may not be stored (by default or by preference) in a log record within the log files 130. Such LOBs, where only current images, or after images, of the LOBs are logged (for inserts, but not for updates or deletes), can be referred to as partially logged LOBs, or as selectively logged LOBs, because prior images of the LOBs are not logged for certain actions (e.g., activity). In other words, logging for the LOBs may only be selectively performed for certain actions (e.g., inserts), but may not be selectively performed for certain actions (e.g., updates or deletes). The LOB completion handler 140 can be configured to produce prior images of partially logged LOBs. In some embodiments, the partially logged LOBs can be referred to LOBs subject to partial logging or selective logging.

With completion of (e.g., completion processing related to) prior images of LOBs (which are subject to selective logging) performed by the LOB completion handler 140, various operations such as undo, drop recovery, and so forth related to the LOBs (which are subject to selective logging) can be performed. For example, data definition language (DDL) for, undo operations related to LOBs can be generated for the DB2 database environment 110 with completion processing of the LOBs subject to selective logging. Also, user data that may be stored in the auxiliary table 114 as LOBs subject to selective logging can be recovered (e.g., restored). In some embodiments, processing of prior images in response to one or more instructions (e.g., recovery instructions) related to, for example, an undo operation can be performed by a recovery module 170 of the LOB completion handler 140 shown in FIG. 1. In such instances, the recovery module 170 can be configured to retrieve (in response to one or more instructions) prior images stored in, for example, the prior image repository 180 after completion processing has been performed.

Without completion processing performed by the LOB completion handler 140, some operations such as undo processing (resetting to the previous value) may not be performed because the prior images of the LOBs subject to selective logging may not be available in a desirable fashion (such as in the prior image repository 180). As another example, without completion processing SQL undo operations may not be generated if an SQL change (update or delete) references column data for some LOB data types. More details related to each of the resources that can be used to produce prior images of LOBs subject to selective logging, and handling of LOBs subject to selective logging during completion processing by the LOB completion handler 140 are described below.

The auxiliary table 114 can be configured to store column data, such as LOBs, that are larger than a threshold limit for storage within the base table 112. The LOBs can be various types of objects such as, for example, extensible markup language (XML) or hypertext markup language (HTML) documents, media files (e.g., audio files, video files, image files). The LOBs can include, or can be, various types of data such as binary data, character data, compressed data, and/or so forth. In some embodiments, LOBs stored within the auxiliary table 114 can have structured data, while others may have unstructured (or simple) data. In some embodiments, each of the LOBs stored within the auxiliary table 114 can be classified as a Binary Large Object (BLOB) if including binary data, as a Character Large Object (CLOB) if including single byte character data, or as a Double Byte Character Large Object (DBCLOB) if including double byte character data.

Because the LOBs can be relatively large (e.g., up to 1-byte less than 2-gigabytes (GB) in some systems) and computationally expensive to manage, the LOBs can be handled (e.g., stored) differently than conventional data (that is smaller than a LOB) within the DB2 database environment 110. The base table 112 stores information identifying (or characterizing) LOBs stored in the auxiliary table 114. In other words, LOBs can be stored in the auxiliary table 114 separate from the base table 112, and the base table 112 can be configured to store information referencing the stored LOBs so that the LOBs can be located by accessing the base table 112 (instead of directly accessing the auxiliary table 114). For example, the base table 112 can include records functioning as an index into auxiliary table 114 where one or more LOBs can be stored. In some embodiments, the base table 112 can include one or more LOB columns that store information about the LOB data. The auxiliary table 114 can be configured to store data for the LOB columns outside of the base table 112 in which they are defined. In some embodiments, the auxiliary table 114 can be referred to as being in a LOB tablespace or an auxiliary tablespace.

The DB2 database environment can be configured with the auxiliary table 114 operating in conjunction with the base table 112 so that the performance of the base table 112 can be improved. For example, LOBs that may be infrequently accessed can be stored in the auxiliary table 114 rather than in the base table 112. By storing these types of rarely-accessed LOBs in the auxiliary table 114 rather than in the base table 112, manipulation or processing of the LOBs can be avoided when using the base table 112 during day-to-day processing of the base table 112. As another example, because LOBs can be relatively large and computationally expensive to manipulate, certain processing related to the LOBs can be more efficiently performed on the base table 112, which can function as an index into the auxiliary table 114. In some embodiments, logging of LOBs can be selectively performed because LOBs, and resulting log records associated with the LOBs, can be relatively large compared to objects (and associated log records) stored in the base table 112

As shown in FIG. 1, the DB2 database environment 110 includes log files 130, a backup repository 135, a DB2 catalog 120, and space map records 17. The log files 130, the backup repository 135, the DB2 catalog 120, and the space map records found in the log 17 are resources that can be used by the LOB completion handler 140 to produce prior images for partially logged LOBs associated with (e.g., stored within, previously stored within) the auxiliary table 114. For example, the space map records 17 can be analyzed to identify one or more partially logged LOBs for completion processing (e.g., completion), and logs stored within the log files 130 and/or backups recorded in the backup repository 135 can be used to produce a prior image of the one or more partially logged LOBs. In some embodiments, partially logged LOBs for completion processing can be referred to as LOBs for completion processing.

The backup repository 135 is configured to store information about, or actually store, backup snapshots (which can be referred to as backups or as image copies) of the base table 112 and/or the auxiliary table 114. Specifically, the backup repository 135 is configured to store information about images of objects stored in the base table 112 and/or auxiliary table 114. Accordingly, prior images of LOBs of the auxiliary table 114 can be stored (e.g., recorded) as, or in, backups the backup repository 135.

In some embodiments, optionally incremental backups of portions of the base table 112 and/or the auxiliary table 114 can be stored (e.g., recorded) in the backup repository 135. The incremental backups can include data related to changes to a particular portion (e.g., an object) of the base table 112 and/or the auxiliary table 114. For example, an incremental backup of only changed portions of a LOB can be stored (e.g., recorded) in the backup repository 135.

In some embodiments, backups of the base table 112 and/or the auxiliary table 114 can be stored periodically, based on a schedule, randomly, in response to changes, in response to manual triggering (e.g., by an administrator), ad hoc, and/or so forth. For example, a backup of the auxiliary table 114 can be stored on a weekly basis starting at a specified time.

As briefly discussed above, log records related to processing executed with respect to objects stored in the base table 112 and/or to objects stored in the auxiliary table 114 can be produced and stored in log files 130. In some embodiments, the process of producing log records in response to changes to the base table 112 and/or the auxiliary table 114 can be referred to as logging. Log records can be produced by, for example, a log manager (not shown) within the DB2 database environment 110.

The log records can include data (e.g., byte data) about (e.g., detailing) the changes made to rows and/or columns of the base table 112 and/or auxiliary table 114. In some embodiments, log can be uniquely identified and located within a log file by a log record sequence number (LRSN), or relative byte address (RBA), and log records written by a single transaction can be identifiable by a field in the log record header.

In some embodiments, log records related to changes in the base table 112 and/or changes to the auxiliary table 114 can be produced (e.g., continually produced) at any time (e.g., between backups of the base table 112 and/or the auxiliary table 114, and so forth). In some embodiments, a backup of the auxiliary table 114 can be stored (e.g., recorded) in the backup repository 135 at a specified time. In response to changes to one or more records in the auxiliary table 114 after the specified time, log records detailing the changes to the one or more records can be produced and stored in the log files 130.

In some embodiments, processing related to the auxiliary table 114 can be optionally logged. Even when logging related to the auxiliary table 114 is activated, the logging can be selectively performed. As mentioned above, logging of complete after images or current images of the auxiliary table 114 may be performed after certain types of operations such as inserts and updates have been executed, but logging of complete prior images (or before images) before execution of deletes and updates may not be performed. In some embodiments, the logging of LOBs stored in the auxiliary table 114 may be selectively performed because logging LOBs can require large amounts of storage due to the size of the LOBs. In some embodiments, logging of certain LOBs greater than or less than a specific size (e.g., larger than 1 GB) may not be performed.

As shown in FIG. 1, the auxiliary table 114 is associated with (e.g., includes) space map records 17. The space map records 17 characterize (e.g., describe) the logical to physical conversion of page locations in the auxiliary table 114. The space map records 17 include information about space map pages (which can be generally referred to as pages) or data pages that are in use, and/or so forth. In some embodiments, the space map records 17 can be referred to as space map objects. Although not shown, in some embodiments, the space map records can include low-level space map records, which can include detailed information related to use of the auxiliary table 114, and high-level space map records, which can include less detailed information related to the use of the auxiliary table 114 than the low-level space map records.

In some embodiments, a space map record from the space map records 17 can include details (e.g., data) about a range of pages within the auxiliary table 114 that are in use, details about which LOBs are stored within the range of pages, details (e.g., data) indicating whether or not the range of pages are in use, and/or so forth. In some embodiments, a value (e.g., a binary value, a bit value) can be used to indicate whether the range of pages is currently in use, or are available for writing. In some embodiments, a value can be used to indicate whether a range of pages that was previously in use is being made available for writing.

As shown in FIG. 1, the DB2 database environment 110 includes a DB2 catalog 120. The DB2 catalog 120 can include one or more tables that store information about data maintained (e.g., controlled, maintained) within the DB2 database environment 110. The DB2 catalog 120 can include information about for example, the base table 112, the auxiliary table 114, log files 130, the backup repository 135, and/or so forth. As a specific example, in some embodiments, one or more catalog records can include specific information about backups that are stored (e.g., recorded) in the backup repository 135.

In some embodiments, the DB2 catalog 120 can store information about backups stored (e.g., recorded) within the backup repository 135. For example, the DB2 catalog 120 can be used to identify whether or not a backup that is stored (e.g., recorded) in the backup repository 135 may include a complete prior image of one or more of the LOBs (e.g., a deleted LOB, an updated LOB) associated with the auxiliary table 114.

In some embodiments, each type of LOB (i.e., BLOB, CLOB and DBCLOB) that is identified in the base table 112 can have a separate LOB column (not shown). Each LOB column can include, for example, a two-byte indicator field and a two-byte version field. The indicator field can indicate whether there is LOB data or not. If this field is NULL or has zero length, data may not be stored in the auxiliary table 114 for the LOB column. In some embodiments, a version field can identify a version of the current LOB data for a given row in the base table 112.

In addition to the LOB columns, the base table 112 can also include at least one ROWID column that stores values (e.g., usually system-generated values) to identify and index the actual LOB data for a given row in the base table 112. During operation, an application program (not shown) can use a LOB identifier to access the actual LOB data stored in the auxiliary table 114.

In some embodiments, the auxiliary table 114 can be partitioned. In such embodiments, the base table 112 can have partitioned portions that correspond to the partitions of the auxiliary table 114.

Figure 2:
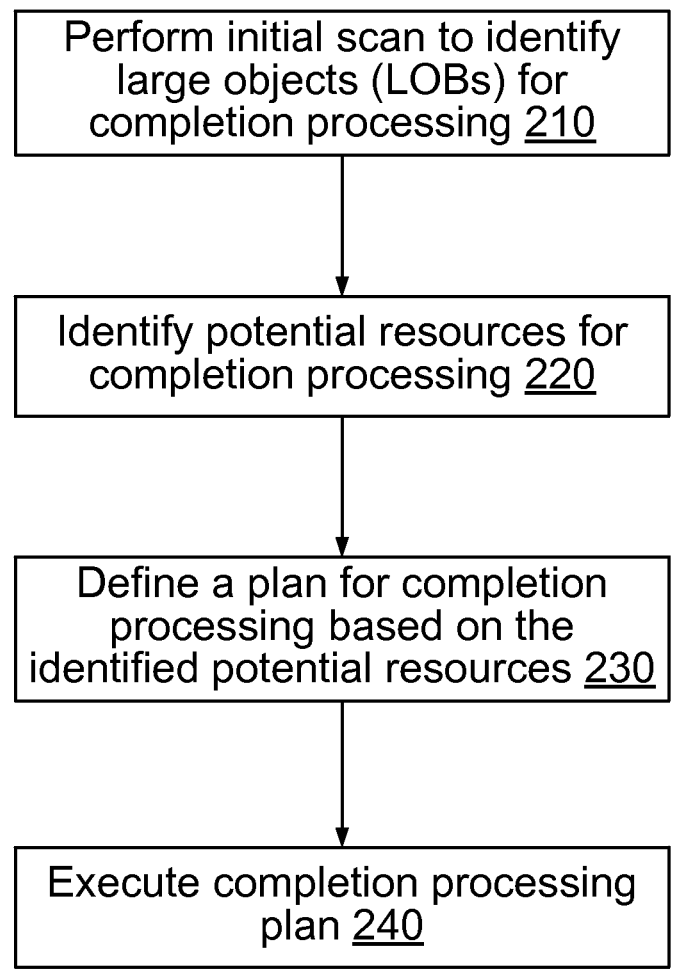
FIG. 2 is a flowchart that illustrates a method that can be used to perform completion processing for large objects (LOBs) associated with an auxiliary table.

FIG. 2 is a flowchart that illustrates a method that can be used by the LOB completion handler 140 to perform completion processing for LOBs (e.g., LOBs subject to selective logging) associated with the auxiliary table 114. The flowchart illustrated in FIG. 2 will be described in conjunction with the components shown in the LOB completion handler 140 of FIG. 1.

As shown in FIG. 2, an initial scan to identify LOBs for completion processing is performed (block 210). A completion identifier 154 of a completion planner 150 of the LOB completion handler 140 (shown in FIG. 1) can be configured to perform the initial scan to identify LOBs (e.g., LOBs subject to selective logging) associated with the auxiliary table 114 for completion processing (e.g., completion). Specifically, in some embodiments, the initial scan performed by the completion identifier 154 can, for example, include scanning ranges of the log files 130 to identify LOBs for completion processing. In some embodiments, the completion identifier 154 can, for example, scan logged space map records 17 (shown in FIG. 1) associated with the logs files 130 to identify pages within the auxiliary table 114 that are no longer in use. A status (e.g., a changed status) of one or more of the pages as no longer being in use, or as being available for reuse, can be used as an indicator that one or more LOBs stored within the auxiliary table 114 have been deleted and/or changed. The status of the pages can be indicated by, for example, a value (e.g., a binary value) or other indicator included in the logged space map records 17.

In some embodiments, the initial scan can be performed by scanning log files 130, which can include logged space map records 17, because scanning log files 130 can be faster than, for example, scanning portions of the auxiliary table 114 and/or base table 112, scanning portions of the DB2 catalog 120, and/or so forth. In some embodiments, the initial scan to identify LOBs for completion processing can be performed periodically, based on a schedule, randomly, in response to changes, in response to manual triggering (e.g., by an administrator), and/or so forth. For example, scanning for LOBs can be performed on a nightly basis starting at a specified time.

In some embodiments, only a portion of the log files 130 associated with a specified time period (and/or implicated in conjunction with completion processing of one or more LOBs) may be scanned. For example, only log files 130 that have not been previously scanned may be scanned so that LOBs associated with the auxiliary table 114 can be identified for (e.g., designated for) completion processing. In some embodiments, only log files 130 associated with LOBs or portions of the auxiliary table 114 that have been identified as potentially requiring completion processing may be scanned.

In some embodiments, a range of pages of within the auxiliary table 114 and/or ranges of log within the log files 130 that may include LOBs for completion processing (e.g., LOBs subject to selective logging) may be identified. In some embodiments, each of the logged space map records 17 associated with (e.g., implicated in conjunction with) the range of pages (and/or log) can be analyzed as potentially being related to a LOB for completion processing. In some embodiments, each of the logged space map records 17 associated with (e.g., implicated in conjunction with) the range of pages, regardless of date/time stamp of the space map record, can be analyzed as potentially being related to a LOB for completion processing. In some embodiments, each of the logged space map records 17 can be analyzed so that, for example, each storage location associated with any backup associated with the LOBs identified for completion processing can be identified and potentially accessed to produce prior images of the LOBs.

The identification of LOBs (e.g., LOBs subject to selective logging) for completion processing can include defining a list of LOBs, compiling information about resources related to the LOBs identified for (e.g., designated for) completion processing, selecting resources for executing completion processing of the identified LOBs (in an efficient fashion), and so forth.

In some embodiments, a list of LOBs (e.g., LOBs subject to selective logging) (or identifiers thereof) that have been identified for completion processing can be produced by the completion identifier 154 (shown in FIG. 1). The list of the LOBs that can be used during completion processing to track completion processing of the LOBs. In some embodiments, only a portion of the LOBs that are eligible for completion processing may be included in the list. For example, several LOBs may be identified for potential completion processing, but only LOBs originally created within a specified timeframe may be included in a list for completion processing.

Resources that can potentially be used for completion processing may be identified (block 220). In other words, resources that could be used (e.g., accessed, interrogated) to produce prior images of one or more LOBs may be identified. In some embodiments, a completion analyzer 156 (shown in FIG. 1) can be configured to identify potential resources for completion processing. The resources can be identified as potential resources at this stage because some of the resources may not be used for execution of completion processing. For example, target prior images of one or more LOBs may be stored in multiple locations within the potential resources. Accordingly, some of the potential resources may not be accessed because of the redundancy of the prior images of the LOBs in multiple locations.

For example, catalog records from the DB2 catalog 120 (shown in FIG. 1) that are associated with the LOBs (e.g., LOBs subject to selective logging) designated for completion processing can be used to identify resources that can be used to execute completion processing. In some embodiments, catalog records from the DB2 catalog 120 associated with LOBs identified for completion processing can be identified and/or catalog records from the DB2 catalog 120 (or portions thereof) can be included in (or otherwise associated with) a list of the LOBs. In some embodiments, one or more of the following parameters from a catalog record can be used during completion processing: table space identifier, table identifier, index values, snapshot copy values, image copy values, SYSCOPY values, and/or so forth.

A catalog record from the DB2 catalog 120 can include an indicator that one or more prior images of a LOB (e.g., a LOB subject to selective logging) identified for completion processing are available on one or more backups (e.g., backup copies) of an auxiliary table associated with the LOB. In some embodiments, the catalog record can include an indicator (e.g., an indicator associated with a SYSCOPY value) that one or more of the prior images stored on the backup are incremental image copies or full image copies (e.g., complete image(s)) of the LOB. In some embodiments, the catalog record from the DB2 catalog 120 can also indicate a location of the backup(s) of the auxiliary table. In some embodiments, one or more catalog records can include an indicator of log records (e.g., log records stored in the log files 130 shown in FIG. 1) (or a range of the log files 130) that can include prior images (or portions thereof) of the LOB (or updates to the LOB).

As a specific example, a prior image of a LOB (e.g., a LOB subject to selective logging) as the LOB existed at a target time may be identified using a catalog record. In other words, the prior image of the LOB at the specified target time may be desired. Although the prior image of the LOB may be stored on a backup of the auxiliary table 114 at a backup time, the prior image of the LOB stored on the backup may have been modified between the backup time and the target time. Accordingly, the prior image of the LOB stored on the backup may not actually be the prior image of the LOB at the target time. Details of the modification may be included in a log record stored in the log files 130. In this example embodiment, the log record may be used in conjunction with the backup of the auxiliary table 114 to produce a prior image of the LOB at the target time. Specifically, the prior image of the LOB at the backup time may be modified based on the log record to produce the prior image of the LOB at the target time. In such embodiments, one or more catalog records from the DB2 catalog 120 can be used to identify the backup of the auxiliary table 114 and the log record that includes details about modifications to the prior image of the LOB stored in the backup.

In some embodiments, at least some portions of the logged space map records 17 associated with the LOBs identified for completion processing can be retrieved (e.g., collected) and included in (or otherwise associated with) a list of the LOBs identified for completion processing. In some embodiments, one or more of the following parameters from the logged space map records 17 can be used during completion processing planning: a database identifier (DBID), a page set identifier, a row identifier (ROWID), a version identifier, a LOB relative byte address (RBA), a unit of recovery identifier (URID), low-level space map sections indicators including a start page and/or a number of pages, and/or so forth.

As a specific example, a space map record from the logged space map records 17 can include an indicator that several pages associated with a LOB are available for reuse because the LOB is being deleted (or has been modified (e.g., updated)). Based on the indicator of the several pages associated with the LOB are available for reuse, the LOB can be identified for (e.g., designated for) completion processing. The location of the several pages, as identified within the space map record, can be used to identify a potential location of the LOB in, for example, a backup (e.g., a backup copy) of the LOB before the LOB was deleted. As a specific example, pages where a deleted LOB was previously stored within an auxiliary table can be identified from a logged space map record. A backup of the auxiliary table may include a prior image of the LOB at the pages identified from the logged space map record because the pages of the backup of the auxiliary table will correspond with pages of the auxiliary table.

After potential resources (e.g., backups, logs) have been identified using, for example, the logged space map records 17 and/or SYSCOPY records from the DB2 catalog 120 or the log, a plan for completion processing based on the identified potential resources can be defined (block 230). In some embodiments, the plan can be referred to as a completion processing plan. In some embodiments, the plan can be, or can include, a schedule. In some embodiments, resources can be selected for completion processing based on the identified potential resources. In other words, a plan (e.g., a schedule) for producing (e.g., retrieving) prior images of the LOBs (e.g., LOBs subject to selective logging) can be defined (e.g., planned) based on at least a portion of the identified potential resources. In some embodiments, only a portion of the resources identified as being associated with LOBs designated for completion processing may be selected and used for producing prior images of the LOBs. In some embodiments, all of the potential resources identified as being associated with LOBs designated for completion processing may be selected and used for producing prior images of the LOBs.

For example, a prior image of first LOB (e.g., a first LOB subject to selective logging) designated for completion processing may be available on a specific resource, and a prior image of a second LOB (e.g., a second LOB subject to selective logging) designated for completion processing may be available on several resources including the specific resource including the prior image of the first LOB. Even though the prior image of the second LOB is available on several resources, completion of the first LOB and the second LOB may be executed using only the specific resource. Accordingly, the specific resource may be selected for completion processing of the first LOB and the second LOB and the remaining resources may not be used during the completion processing. Thus, at least a portion of the resources associated with the second LOB may be excluded from completion processing because of the overlap between the specific resource associated with the first LOB and the resources associated with the second LOB.

In some embodiments, the resources can be selected from the potential resources and used for execution of completion processing (and included in a plan for completion processing) based on a cost (e.g., an efficiency, an estimated cost, a projected cost) calculation. In some embodiments, the cost calculation can include, or can be based on, a time of execution, a computational resource (e.g., an availability of a computational resource), an administrative resource, a resource type (e.g., a preference for a resource type), and/or so forth. In some, the values used in the cost calculation can be projected values that can be simulated, defined by an administrator, and so forth.

For example, a set of potential resources may be identified for completion processing of a set of LOBs. Because each space map record 17 associated with a particular page range may be analyzed to identify resources, multiple resources can include prior images of one or more LOBs identified as potential resources for completion processing. A cost for execution of the completion processing of the set of LOBs can be greater using a first portion of the set of potential resources than a cost for execution of the completion processing of the set of LOBs using a second portion of the set of potential resources. Accordingly, the second portion of the set of potential resources may be used to produce prior images of the LOBs because of the relatively low cost of using the second portion of the subject resource.

As another example, completion processing of a set of LOBs (e.g., LOBs subject to selective logging) may be performed using a first combination of backups and logs or using a second combination of backups and logs. A cost for execution of the completion processing of the set of LOBs can be greater using the first combination of resources than a cost for execution of the completion processing of the set of LOBs using the second combination of resources. Accordingly, the completion processing may be performed for the set of LOBs using the second combination of resources. In some embodiments, completion processing of a LOB may be performed based on multiple backups. For example, optionally a first portion of a LOB may be retrieved from a first backup and a second portion of the LOB may be retrieved from a second backup.

As yet another example, in some embodiments, a target LOB may be stored on, or included in, multiple resources (e.g., multiple backups, multiple logs). In such embodiments, a first resource that can be used (e.g., used a single time, used multiple times) for completion processing of other LOBs, in addition to retrieval of an image of the target LOB, may be selected from the multiple resources as opposed to a second resource from the multiple resources that may only be used one time for retrieval of the image of the target LOB. In such embodiments, the number of resources that may be required for completion processing may be reduced by selecting the first resource, which can be used for completion processing of other LOBs.

In some embodiments, a plan for completion processing of a set of LOBs can include processing each LOB from the set of LOBs in a specified order (e.g., a specified order within a schedule, a specified order within a linked list). In some embodiments, the order for processing the LOBs from the set of LOBs can be defined based on one or more cost calculations. For example, a set of potential resources may be identified for completion processing of a set of LOBs in a specified order because processing the set of LOBs in the specified order may be more efficient than processing the set of LOBs in another order different from the specified order. In some embodiments, the order for processing the LOBs can be performed on a first in, first out basis. In other words, a LOB that is identified and/or changed at a first time (and is the oldest), may be processed before a LOB that is identified and/or changed at a second and later time (and is more recent).

In some embodiments, the defining of a plan for completion processing can be iteratively, or dynamically, performed. For example, resources can be selected from a set of potential resources for completion processing of a set of LOBs. The resources can be selected for completion processing of the set of LOBs in an order. A cost for execution of the completion processing of the set of LOBs using the order and selected resources can be calculated. The cost for execution of completion processing can be recalculated after modifying the order and/or the selected resources. Adjustments may be performed iteratively until a comparison threshold or condition (e.g., a target comparison threshold) is satisfied. In some embodiments, if a determination is made that completion processing may not be performed (e.g., may not be performed because certain necessary records, log files, backups, etc. do not exist as determined during a cost calculation) for a specified LOB, completion processing related to the specified LOB may be terminated.

In some embodiments, prior images of LOBs (e.g., LOBs subject to selective logging) before or after a specified scan range can be identified. For example, specific pages on a backup may be identified as storing a prior image (or portion thereof) of a LOB. In some embodiments, the pages on the backup can be processed in the order that they are associated with (or as included in or linked within) a LOB (and accordingly, may be out-of-order on the backup). Pages around (e.g., before, after) the specified pages (or a description of the pages stored in a catalog record and/or a space map record) may be scanned to determine whether or not additional prior images of LOBs identified for (e.g., designated for) completion processing may exist on the backup. If additional prior images of LOBs designated for completion processing are found, the additional prior images of the LOBs can be retrieved using the backup.

As shown in FIG. 2, after the plan for completion processing has been defined, the completion processing plan can be executed (block 240). A completion execution module 160 of the LOB completion handler 140 (shown in FIG. 1) can be configured to execute the plan for completion processing.

In some embodiments, at least some portions of a plan for completion processing can be modified as the plan is being executed. For example, as a first portion of the plan for completion processing is being executed, cost calculations (e.g., efficiency calculations) related to a second portion of the plan for completion processing can be performed. The second portion of the plan for completion processing can be modified in response to the cost calculations. More details related to identification of potential resources and selection of resources during completion processing are described in connection with, for example, FIGS. 3A through 5.

In some embodiments, the LOB completion handler 140 can be included in, for example, a software product that can use DB2 log records for various purposes such as Log Master for DB2 by BMC Software. Log Master is a software tool that can be configured to perform transaction log analysis for a DB2 database environment (e.g., DB2 database environment 110 shown in FIG. 1). Log Master can be configured to resolve problematic transactions using SQL statements generated from (or using) the information in the log records (e.g., log records included in the log files 130 shown in FIG. 1) as well as migrate data or reports on the same log records. For example, Log Master can be configured to analyze log records included in the log files 130 and locate transactions for the purpose of auditing, migration or data recovery. For data recovery, Log Master can be configured to generate SQL statements to correct problematic transactions by performing, for example, an undo or a redo operation, Log Master may also be used to migrate data from a production database to other databases used for backup, historical information, decision support, and/or warehousing.

In some implementations, the LOB completion handler 140 can be configured to operate at a host device. In such implementations, the LOB completion handler 140 can access the DB2 database environment 110 through a network. In some embodiments, the functionality of the LOB completion handler 140 can be called and/or executed on an on-demand basis. In some implementations, the LOB completion handler 140 can function as a background application operating in conjunction with the DB2 database environment 110. In some implementations, the LOB completion handler 140 can function as an application (or service) that can be accessed via an application programming interface (API).

The LOB completion handler 140 can be, or can include, any type of hardware and/or software configured to access the DB2 database environment 110. In some implementations, one or more portions of the components shown in the LOB completion handler 140 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the LOB completion handler 140 can be, or can include, a software module configured for execution by at least one processor (not shown). In some implementations, the functionality of the components can be included in different modules and/or different components than those shown in FIG. 1. For example, although not shown, the functionality of the LOB completion handler 140 can be included in a different module than the LOB completion handler 140, or divided into several different modules.

Although not shown, in some implementations, the LOB completion handler 140 (or portions thereof) and/or the DB2 database environment 110 (or portions thereof) can be configured to operate within, for example, a data center (e.g., a cloud computing environment), a computer system, one or more server/host devices, and/or so forth. In some implementations, the LOB completion handler 140 (or portions thereof) and/or the DB2 database environment 110 (or portions thereof) can be configured to operate within a network. Thus, the LOB completion handler 140 (or portions thereof) and/or the DB2 database environment 110 (or portions thereof) can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

The LOB completion handler 140 and/or the DB2 database environment 110 can be configured to operate based on one or more platforms (e.g., one or more similar or different platforms) that can include one or more types of hardware, software, firmware, operating systems, runtime libraries, and/or so forth. In some implementations, the LOB completion handler 140 and/or the DB2 database environment 110 can represent a cluster of devices (e.g., a server farm). In such an implementation, the functionality and processing of the LOB completion handler 140 and/or the DB2 database environment 110 can be distributed to several devices of the cluster of devices.

Figure 3A:
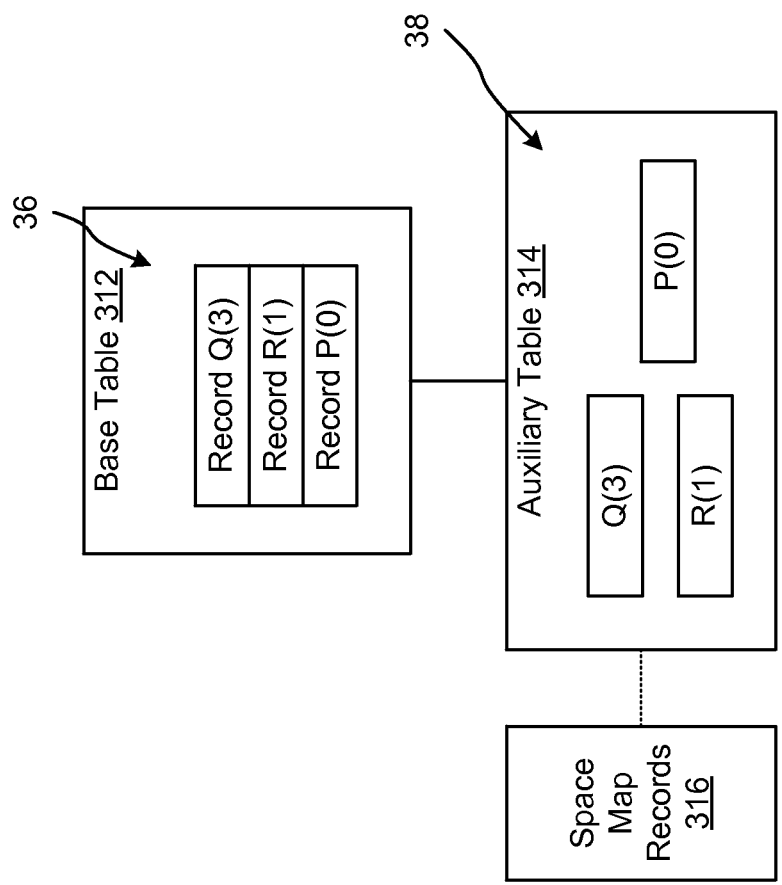
FIG. 3A is a diagram that illustrates a base table associated with an auxiliary table.

FIG. 3A is a diagram that illustrates a base table 312 associated with an auxiliary table 314. As shown in FIG. 3A, the base table 312 includes records 36 that reference LOBs 38 stored in the auxiliary table 314. For example, record Q(3) characterizes (e.g., describes) LOB Q(3) stored in the auxiliary table 314. The auxiliary table 314 shown in FIG. 3A is a current (or active) snapshot of the LOBs 38 stored in the auxiliary table 314. In this embodiment, the LOBs 38 stored in the auxiliary table 314 are partially logged LOBs (or subject to selective logging). Accordingly, prior images of the LOBs 38 are not logged for transactions performed on the LOBs 38 such as deletes or updates.

In this embodiment, the characters in parentheses next to the identifier of the LOB represent a version of the LOB. For example, LOB Q(3) is stored in auxiliary table 314. A prior image of the LOB Q(3) can be represented as LOB Q(2). As shown in FIG. 3A, logged space map records 316 functioning as indices (e.g., pointers) into the auxiliary table 314 are associated with the auxiliary table 314.

Figure 3B:
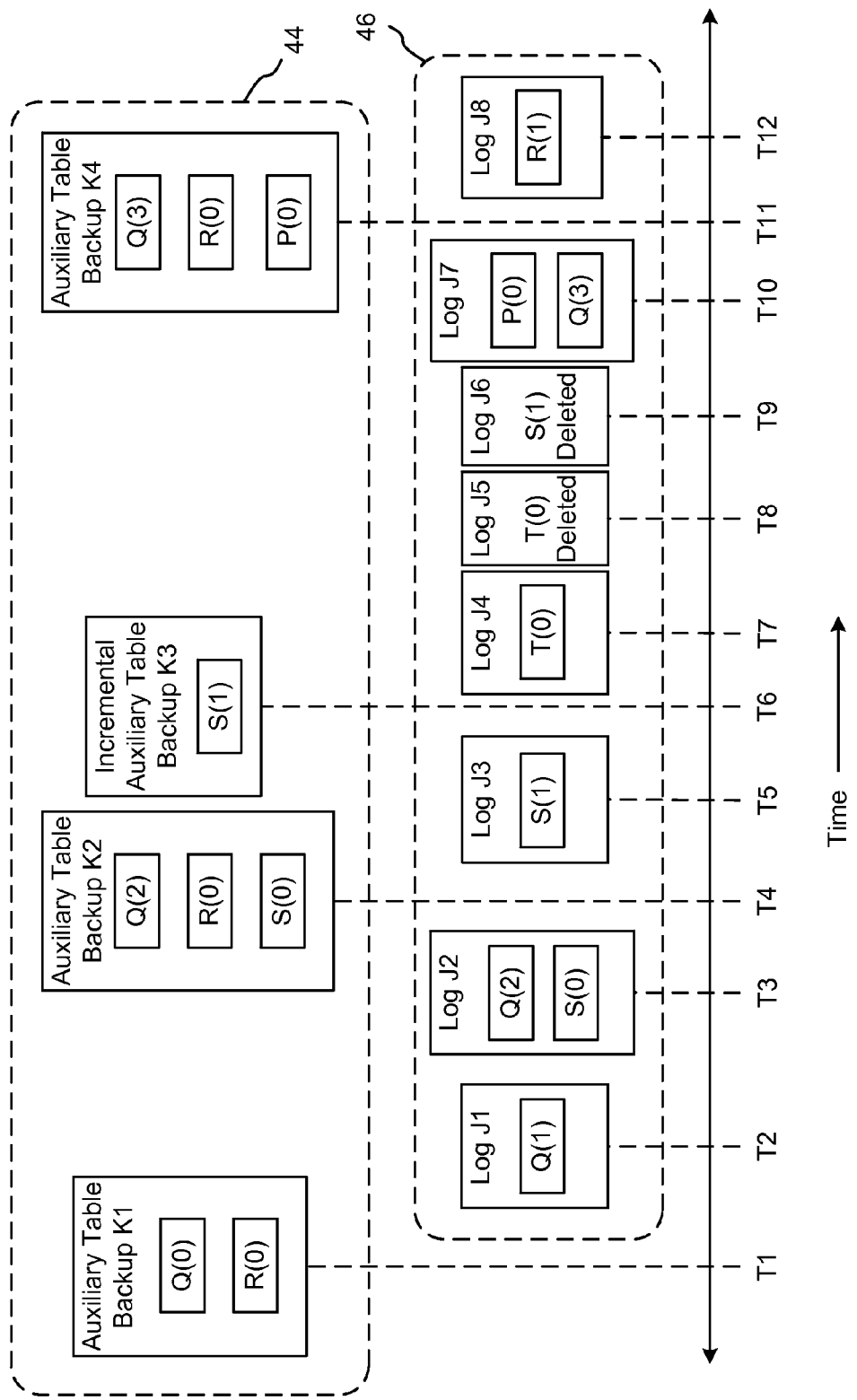
FIG. 3B is a diagram that illustrates auxiliary table backups and log records associated with the auxiliary table shown in FIG. 3A.

FIG. 3B is a diagram that illustrates auxiliary table backups 44 and log records 46 associated with the auxiliary table 314 shown in FIG. 3A. Because the LOBs 38 shown in FIG. 3A are partially logged (or subject to selective logging), the auxiliary table backups 44 (which can be referred to as backups) and/or the log records 46 (which can be referred to as logs) can be used to produce (e.g., generate, reconstruct) prior images of the LOBs 38. As shown in FIG. 3B, time is increasing to the right.

The log files 46, which include log files J1 through J8 (referred to as logs J1 through J8), can be portions of a continuum of log related to database transactions such as inserts, updates, deletes, and/or so forth. The backups, which include backups K1 through K4, can be backups that are produced based on a schedule, in response to changes, and so forth. In this embodiment, the backup K3 is an incremental backup. The backups K1 through K4 are backups of the auxiliary table 314 shown in FIG. 3A. The backups K1 through K4, unless identified as an incremental backup, include complete prior images of the LOBs 38 stored in the auxiliary table 314. The logs 46 can include complete prior images (e.g., complete prior images for insert transactions) or updates to prior images included in the backups 44.

As mentioned above, in this embodiment, the characters in parentheses next to the identifier of the LOB represent a version of the LOB. For example, auxiliary table backup K1, which is produced at time T1, includes LOB Q(0), and log J1, which is produced at time T2, includes LOB Q(1) (which can be an after image). Accordingly, log J1 can include updates (or a full image) that can be used to produce (e.g., retrieve) LOB Q(1), which can be an updated version of LOB Q(0).

As mentioned above, complete prior images of the LOBs 38 stored in the auxiliary table 314 can be produced (e.g., obtained, generated, reconstructed) using combinations of the backups 44 and the logs 46. For example, auxiliary table backup K1, log J1, and log J2 can be used (e.g., accessed, manipulated) to produce a prior image of LOB Q between times T3 and T4. In this embodiment, backup K1 can be accessed because backup K1 includes a complete prior image of Q (i.e., Q(0)) before time T4. Because log J1 and log J2 may only include updates to a prior complete image, the last known complete prior image of Q is accessed in backup K1. In some embodiments, the logs J1 and J2 can be referred to as logs (or ranges of log) implicated by the prior image Q(0) to produce a prior image of LOB Q between times T3 and T4.

If LOB R is also identified (in addition to LOB Q) for completion processing, backup K1 can be used to obtain a prior image of LOB R (i.e., R(0)). Because LOB R is not changed between times T1 and T11, prior images of LOB R can also be produced (e.g., obtained) from, for example, backups K2 and K4. However, LOB R may more efficiently be produced using backup K1 because backup K1 is already being accessed to produce a prior image of LOB Q between times T3 and T4. During completion process planning, the overlap between resources can be identified, and only backup K1 may be selected and accessed to avoid accessing other backups to produce prior images of LOBs Q and R.

In some embodiments, if log J2 is identified (e.g., identified within a DB2 catalog record, identified within the log J2) as including a complete image of Q, only log J2 may be accessed to produce (e.g., retrieve) a complete prior image of Q between times T3 and T4. If a prior image of the LOB Q, as it exists after time T4, is desired (instead of between times T3 and T4), backup K2 alone can be used to produce the prior image of LOB Q (i.e., Q(2)) after time T4 rather than accessing backup K1 and logs J1 and J2. As shown in FIG. 3B, the LOB Q is updated again at time T10, and the image of LOB Q stored in backup K4 is identical to the image stored in the auxiliary table 314 shown in FIG. 3A.

As another example, log J4 can be used (e.g., accessed, manipulated) to produce a prior image of LOB T before LOB T is deleted at time T8 (which can be logged in log J5). In some embodiments, the deletion of LOB T can be detected based on a scan of one or more logged space map records 316 associated with the auxiliary table 314. For example, a space map record from the logged space map records 316 can indicate that pages within the auxiliary table 314 associated with LOB T are no longer in use because LOB T has been deleted from the auxiliary table 314 (and thus does not appear in the auxiliary table 314 shown in FIG. 3A). The space map records 316 can be updated with the deletion of LOB T when the LOB T is deleted at time T8. In this embodiment, LOB T is inserted, as indicated within the log J4, at time T7. In this embodiment, a backup of LOB T is not produced at any time during this timeline. Thus, a prior image of LOB T may only be produced based on the logs 46.

As another example, backup K2 and log J3 can be used (e.g., accessed, manipulated) to produce a prior image of LOB S before LOB S is deleted at time T9 (which is partially logged in log J6 (e.g., logged in a space map record)). In some embodiments, the deletion of LOB S can be detected based on a scan of one or more logged space map records 316 associated with the auxiliary table 314. In this embodiment, LOB S is inserted at time T3 in log J2. In the process of scanning log J3 (which may be implicated in determine an efficient method for completing LOB S), the prior image of LOB S (i.e., S(1)) can be obtained. In some embodiments, the prior image of LOB S can be produced using other combinations of backups 44 and logs 46. For example, a prior image of LOB S, before LOB S is deleted at time T9, can be produced using a combination of K2 and log J3, or using backup K3 (which is an incremental auxiliary table backup of changes made to log S). In this embodiment, the log 46 between times T3 and T9 may be implicated during the process of completing LOB S.

In some embodiments, cost calculations can be performed to determine whether or not accessing a combination of backup K2 and log J3 would be more efficient than accessing just backup K3 to perform completion processing of LOB S. In some embodiments, if a full image of LOB S is not found on backup K3 (if backup K3 is accessed first for completion processing of LOB S), then the combination of backup K2 and log J3 can be accessed to complete LOB S. In some embodiments, the resources used to produce a prior image of LOB S can be contingent on resources that may already be used to produce prior images of other LOBs, and can be selected during planning of completion of the other LOBs.

Figure 4:
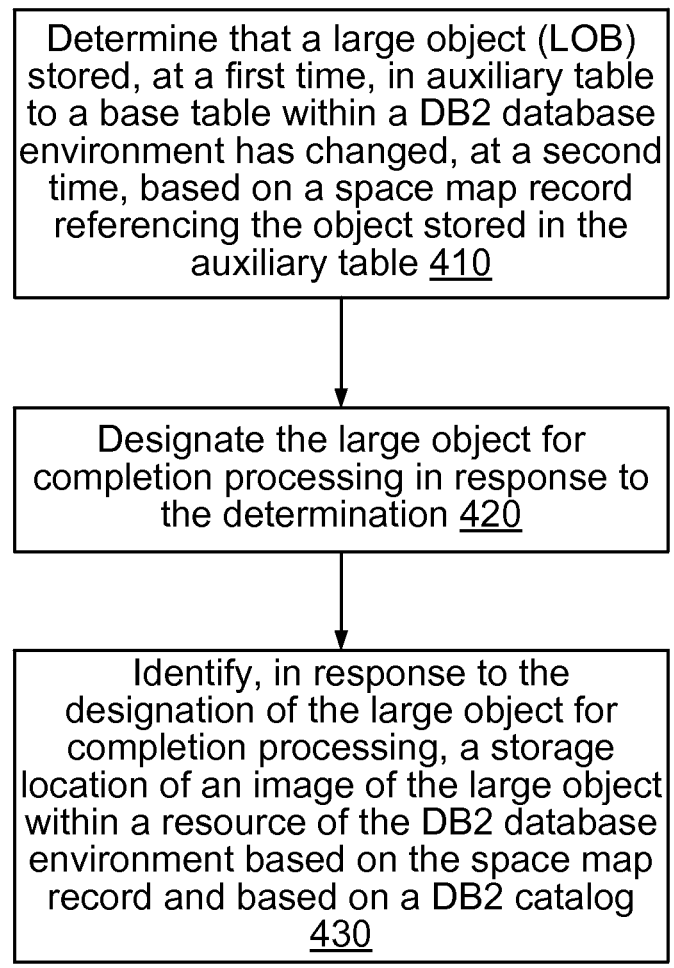
FIG. 4 is a flowchart that illustrates a method for completion of large objects, according to an embodiment.

FIG. 4 is a flowchart that illustrates a method for completion of large objects, according to an embodiment. In some embodiments, at least some portions of the method can be performed by the LOB completion handler 140 shown in FIG. 1.

A determination is made that a large object (LOB) stored, at a first time, in an auxiliary table to a base table within a DB2 database environment has changed, at a second time, based on a space map record referencing the large object stored in the auxiliary table (block 410). In some embodiments, the completion identifier 140 shown in FIG. 1 can be configured to make the determination that the large object stored in the auxiliary table to the base table within the DB2 database environment has changed based on the space map record referencing large object stored in the auxiliary table.

The large object is designated for completion processing in response to the determination (block 420). In some embodiments, the large object can be designated for (e.g., identified for) completion processing by the completion identifier 154 shown in FIG. 1. In some embodiments, an identifier of a large object can be included in a list of large objects designated for completion processing.

In response to the designation of the large object for completion processing, a storage location of an image of the large object within a resource of the DB2 database environment is identified based on the space map record and based on a DB2 catalog (block 430). In some embodiments, the storage location of the image (which can be a prior image) of the large object within the resource of the DB2 database environment can be identified by the completion analyzer 156 shown in FIG. 1. In some embodiments, the resource can include at least one of a log record (e.g., a log record stored in the log files 130 shown in FIG. 1), a backup (e.g., a backup recorded in the backup repository 135 shown in FIG. 1), and so forth. In some embodiments, completion processing of large object can be optimized based on other resources (e.g., a pool of resources) identified for completion processing of other LOBs.

Figure 5:
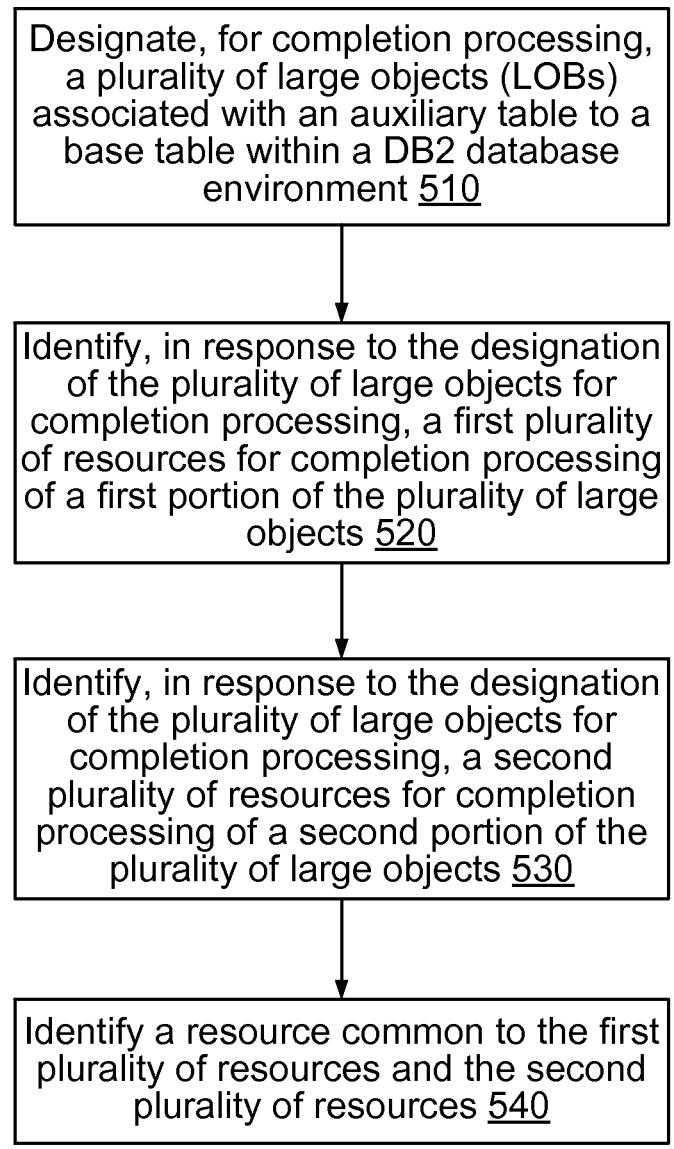
FIG. 5 is a flowchart that illustrates another method for completion of large objects, according to an embodiment.

FIG. 5 is a flowchart that illustrates another method for completion of large objects, according to an embodiment. In some embodiments, at least some portions of the method can be performed by the LOB completion handler 140 shown in FIG. 1.

A plurality of large objects (LOB) associated with an auxiliary table to a base table within a DB2 database environment is designated for completion processing (block 510). In some embodiments, the completion identifier 140 shown in FIG. 1 can be configured to designate the plurality of large objects associated with the auxiliary table for completion processing. In some embodiments, the designation can be made by the completion identifier 140 based on one or more logged space map records (e.g., space map records 17 shown in FIG. 1) associated with the plurality of large objects.

In response to the designation of the plurality of large objects for completion processing, a first plurality of resources for completion processing of a first portion of the plurality of large objects is identified (block 520).

In response to the designation of the plurality of large objects for completion processing, a second plurality of resources for completion processing of a second portion of the plurality of large objects is identified (block 530). In some embodiments, the first plurality of resources and/or the second plurality of resources can be identified based on, for example, one or more catalog records associated with a DB2 catalog (e.g., DB2 catalog 120 shown in FIG. 1), one or more logged space map records (e.g., logged space map records 17 shown in FIG. 1), and/or so forth. In some embodiments, the first plurality of resources and/or the second plurality of resources can include at least one of a log record (e.g., a log record stored in the log files 130 shown in FIG. 1), a backup (e.g., a backup recorded in the backup repository 135 shown in FIG. 1), and so forth.

A resource common to the first plurality of resources and the second plurality of resources is identified (block 540). In some embodiments, the resource common to the first plurality of resources and the second plurality of resources can be identified by the completion analyzer 156 shown in FIG. 1. In some embodiments, at least a portion of the first plurality of resources and/or at least a portion of the second plurality of resources may not be used for (e.g., may be excluded from) completion processing based on overlap of the first plurality of resources and the second plurality of resources.

As mentioned above, the completion processing for LOBs can be performed in a dynamic fashion and/or iterative fashion. As a specific example, a set of LOBs, LOB M1 through LOB M10, can be identified for completion processing using one or more of the methods described above. The LOBs M1 through M10 can be ordered for completion processing so that the oldest LOBs (LOB M1 in this case) identified for completion processing are processed first and the newest LOBs (LOB M10 in this case) identified for completion processing are processed last. A first set of resources (e.g., backups, log files) can be identified for completion processing of LOB M1. The first set of resources can be analyzed (e.g., DB2 catalog records associated with the first set of resources can be accessed) to determine that completion processing of LOBs M2 through M4, and LOB M6 may be performed using the first set of resources. In response to this determination, completion processing of LOBs M1 through M4, and LOB M6 can be performed. A second set of resources for completion processing of LOB M5 can be identified (since LOB M5 is the next LOB identified for completion processing which has not yet been completed). Completion processing for LOB M5, and other LOBs from the remaining LOBs (i.e., LOBs M7 through M10), can be performed using the second set of resources. This dynamic and iterative manner of completion processing can be performed until completion processing for all of the LOBs has been performed.

Figure 6:
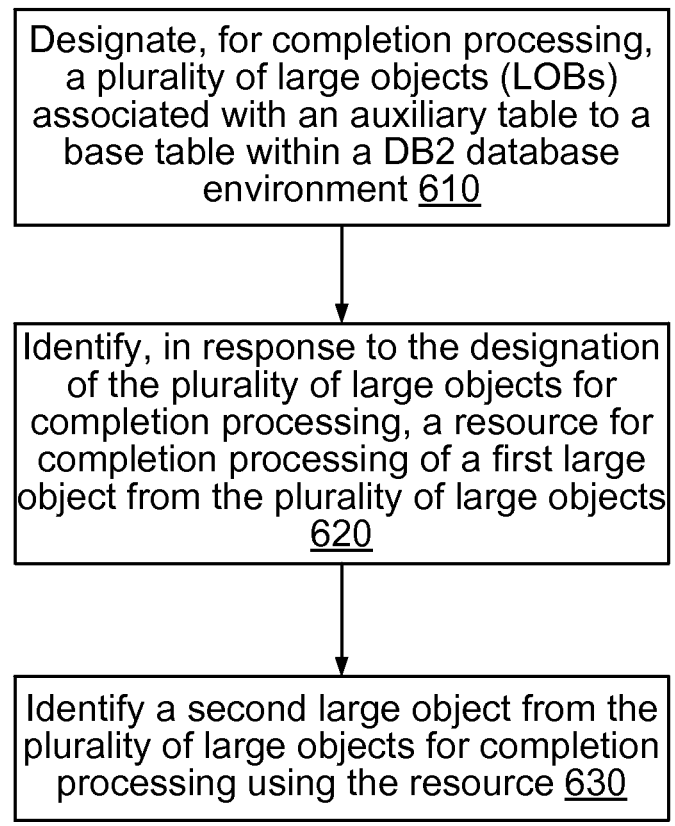
FIG. 6 is a flowchart that illustrates yet another method for completion of large objects, according to an embodiment.

FIG. 6 is a flowchart that illustrates yet another method for completion of large objects, according to an embodiment. In some embodiments, at least some portions of the method can be performed by the LOB completion handler 140 shown in FIG. 1.

A plurality of large objects (LOB) associated with an auxiliary table to a base table within a DB2 database environment is designated for completion processing (block 610). In some embodiments, the completion identifier 140 shown in FIG. 1 can be configured to designate the plurality of large objects associated with the auxiliary table for completion processing. In some embodiments, the designation can be made by the completion identifier 140 based on one or more space map records (e.g., space map records 17 shown in FIG. 1) associated with the plurality of large objects.

In response to the designation of the plurality of large objects for completion processing, a resource for completion processing of a large object from the plurality of large objects is identified (block 620). In some embodiments, the resource can be identified based on, for example, one or more catalog records associated with a DB2 catalog (e.g., DB2 catalog 120 shown in FIG. 1), one or more space map records (e.g., space map records 17 shown in FIG. 1), and/or so forth. In some embodiments, the resource can include at least one of a log record (e.g., a log record stored in the log files 130 shown in FIG. 1), a backup (e.g., a backup recorded in the backup repository 135 shown in FIG. 1), and so forth.

A second large object from the plurality of large objects is identified for completion processing using the resource (block 630). In some embodiments, the second large object can be identified by the completion analyzer 156 shown in FIG. 1. In some embodiments, the processing associated with blocks 620 and 630 can be performed iteratively. In some embodiments, the processing associated with blocks 620 and 630 can be performed iteratively until completion processing for all of the LOBs from the plurality of LOBs is performed.

In some embodiments, the LOBs can be identified for completion processing in an order (e.g., a predefined order, order within an ordered list, a first in, first out (FIFO) list). As additional LOBs are processed (e.g., selectively processed) out of order due to use (e.g., re-use) of resources for completion processing of the additional LOBs using the iterative process described above, processing of the remaining LOBs can proceed in the order (e.g., as they appear within an ordered list). Processing of the remaining LOBs can proceed in the order until out-of-order processing is triggered based on re-use of resources.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (e.g., a computer-readable medium, a tangible computer-readable medium) or in a propagated signal, for processing by, or to control the operation of, data processing apparatus, e.g., a programmable processor, a computer, or multiple computers. In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An apparatus, comprising:
a memory; and
a processor operably coupled to the memory and configured to cause the apparatus to include:
a completion identifier configured to identify, for completion processing, a large object (LOB) deleted from an auxiliary table within a relational database management system environment based on a space map record associated with the large object, the auxiliary table functioning as an auxiliary space to a base table; and
a completion analyzer configured to identify a resource where an image of the large object is stored at a time before the deletion of the large object from the auxiliary table, wherein the resource is a backup of the auxiliary table stored at a time before the deletion of the large object.

2. The apparatus of claim 1, wherein the resource is a backup of the auxiliary table and the image of the large object is a first image of the large object, and the completion analyzer is configured to identify a log including data related to a modification of the first image of the large object,
the apparatus further comprising:
a completion execution module configured to produce a second image of the large object based on the first image of the large object and based on the log.

3. The apparatus of claim 1, wherein the large object is a first large object, the completion identifier is configured to identify a second large object modified within the auxiliary table,
the completion analyzer is configured to identify the resource as including an image of the second large object before modification of the second large object within the auxiliary table.

4. The apparatus of claim 1, further comprising:
a completion execution module configured to retrieve at least a portion of the image of the large object from the resource; and
a recovery module configured to receive a recovery instruction, and configured to restore the at least the portion of the image of the large object to the auxiliary table in response to the recovery instruction.

5. The apparatus of claim 1, wherein the large object stored in the auxiliary table is referenced within a record from a plurality of records in a base table.

6. The apparatus of claim 1, further comprising:
a completion execution module configured to retrieve at least a portion of the image of the large object from the resource, and configured to store the at least the portion of the image of the large object in an image repository outside of the relational database management system environment.

7. The apparatus of claim 1, wherein the resource is at least one of a log file or an auxiliary table backup identified based on a relational database management system catalog storing information about data maintained within the relational database management system environment.

8. The apparatus of claim 1, wherein an image of the large object in response to being deleted is unlogged.

9. The apparatus of claim 1, wherein the auxiliary table is a large object tablespace within the relational database management system environment.

10. A non-transitory computer-readable storage medium storing instructions that when executed cause a processor to perform a process, the instructions comprising instructions to:
- determine that a large object (LOB) stored, at a first time, in an auxiliary table to a base table within a relational database management system environment has changed, at a second time, based on a space map record referencing the large object stored in the auxiliary table;
- designate the large object for completion processing in response to the determination;
- identify, in response to the designation of the large object for completion processing, a storage location of an image of the large object within a resource of the relational database management system environment based on the space map record and based on a relational database management system catalog; and
- retrieve, as a portion of the completion processing, the image of the large object prior to a change from the storage location of the resource.

11. The non-transitory computer-readable storage medium of claim 10, wherein the storage location spans a plurality of pages being linked in a sequential order,
the instructions further comprising instructions to:
- retrieve, as a portion of the completion processing, a copy of the image of the large object prior to the change from the storage location of the resource based on processing of each page from the plurality of pages in the sequential order.

12. The non-transitory computer-readable storage medium of claim 10, wherein the resource is a backup of the auxiliary table,
the instructions further comprising instructions to:
- identify a log associated with the backup of the auxiliary table and stored after the backup of the auxiliary table was stored;
- retrieve, as a portion of the completion processing, the image of the large object prior to the change from the storage location of the resource; and
- produce a modified version of the image of the large object based on the log.

13. The non-transitory computer-readable storage medium of claim 10, wherein at least a portion of the storage location of the image of the large object within the resource corresponds with at least a portion of a storage location of an image of the large object available in the auxiliary table.

14. The non-transitory computer-readable storage medium of claim 10, wherein the large object is a first large object and the storage location is a first storage location,
the instructions further comprising instructions to:
- designate a second large object for completion processing;
- determine that an image of the second large object is available on the resource; and
- retrieve the image of the second large object starting at a second storage location of the resource.

15. The non-transitory computer-readable storage medium of claim 10, wherein the large object is stored in a storage location at the first time, the storage location is identified as being available for writing in the space map record at the second time.

16. The non-transitory computer-readable storage medium of claim 10, wherein the large object is a first large object, the instructions further comprising instructions to:
- designate a second large object for completion processing; and
- determine that an image of the second large object is available on the resource based on a space map record referencing the second large object and based on the relational database management system catalog.

17. The non-transitory computer-readable storage medium of claim 10, wherein the large object is a first large object, the instructions further comprise instructions to:
- identify a second large object modified within the auxiliary table, and
- identify the resource as including an image of the second large object before modification of the second large object within the auxiliary table.

18. A non-transitory computer-readable storage medium storing instructions that when executed cause a processor to perform a process, the instructions comprising instructions to:
- designate, for completion processing, a plurality of large objects (LOB) associated with an auxiliary table to a base table within a relational database management system;
- identify, in response to the designation of the plurality of large objects for completion processing, a first plurality of resources for completion processing of a first portion of the plurality of large objects;
- identify, in response to the designation of the plurality of large objects for completion processing, a second plurality of resources for completion processing of a second portion of the plurality of large objects; and
- identify a resource common to the first plurality of resources and the second plurality of resources.

19. The non-transitory computer-readable storage medium of claim 18, further comprising instruction to:
- retrieve, as a portion of the completion processing, at least a portion of an image of a first large object from the plurality of large objects and a second large object from the plurality of large objects from the resource common to the first plurality of resources and the second plurality of resources.

20. The non-transitory computer-readable storage medium of claim 18, further comprising instruction to:
- iteratively calculate a cost for performing the completion processing based on the first plurality of resources and the second plurality of resources.

21. The non-transitory computer-readable storage medium of claim 18, further comprising instruction to:
- exclude at least a portion of the first plurality of resources for analysis during completion processing based on overlap between the first plurality of resources and the second plurality of resources.

22. The non-transitory computer-readable storage medium of claim 18, further comprising instruction to:
- receive a request to retrieve an image of at least one large object from a plurality of images at a specified time, at least a portion of the first plurality of resources is identified based on the specified time.

* * * * *